Feb. 8, 1944.  J. A. LARSSON  2,341,277
AUXILIARY ATTACHMENT FOR 'KNEE TYPE' LATHE TOOLS
Filed Nov. 4, 1942
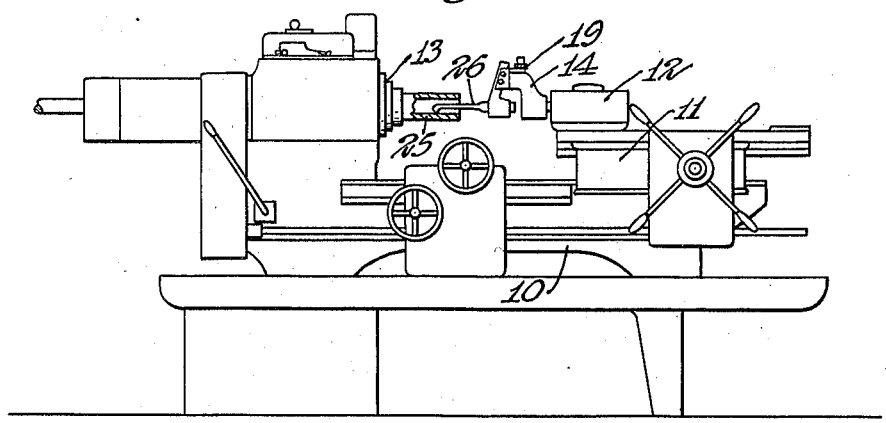
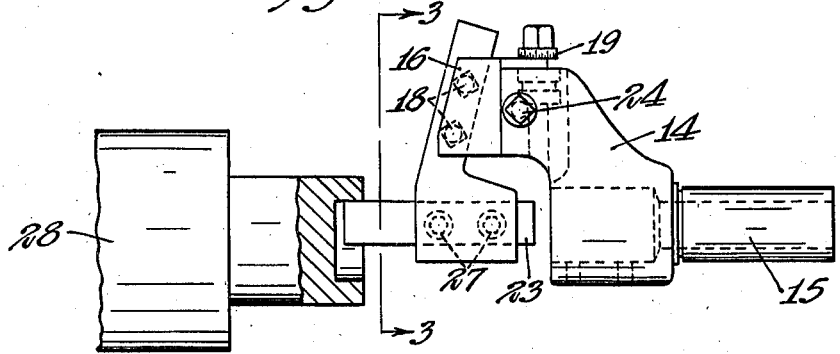
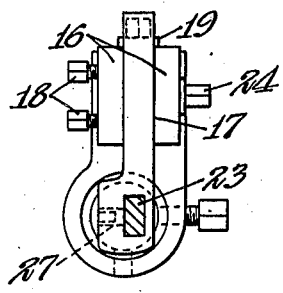
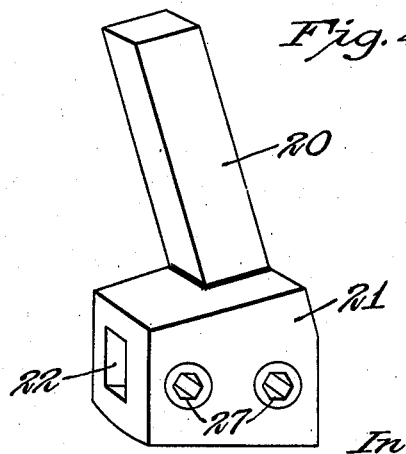
Inventor
John A. Larsson
By Michael & Michael
Attorneys Patented Feb. 8, 1944

2,341,277

UNITED STATES PATENT OFFICE 2,341,277

AUXILIARY ATTACHMENT FOR "KNEE TYPE" LATHE TOOLS

John A. Larsson, Edina, Minn.

Application November 4, 1942, Serial No. 464,438

1 Claim. (Cl. 77—58)

My invention provides an extremely simple and highly efficient attachment for "knee type" lathe tools and, generally stated, consists of the novel devices, combinations of devices, construction and arrangement of parts hereinafter described and defined in the claim.

These so-called "knee type" tools are primarily adapted to hold a cutting tool for cutting the surface or exterior of bars or the like secured in and rotated by the chuck of a lathe.

My improved auxiliary cutter holder is an extremely simple device that quickly adapts the lathe equipped with the said knee tool to bore through or counterbore lathe held bars or like work articles.

A preferred form of the invention is illustrated in the accompanying drawing wherein like characters indicate like parts throughout the several views.

Referring to the drawing:

Fig. 1 is a view in side elevation with some parts sectioned showing the improved auxiliary attachment or supplemental cutter tool holding device applied in working position;

Fig. 2 is a detail view in elevation showing the auxiliary device or attachment removed from the lathe but in operative position for boring out or counterboring a shaft or the like, assumed to be held in the lathe chuck;

Fig. 3 is a section taken on the line 3—3 of Fig. 2; and

Fig. 4 is a view in perspective showing the auxiliary holder or attachment.

The particular lathe structure, of course, constitutes no part of the present invention, and hence, the parts thereof, insofar as necessary to the purpose of this case, may be briefly designated as follows: the lathe frame work 10, the carriage 11, the tool-holding block 12, and the lathe chuck 13. The parts of the knee tool, assumed to be of the specific character above noted, may be designated as follows, to wit: the approximately L-shaped knee 14, with anchoring shank 15, and the radially adjustable knee head 16. This head 16 is bifurcated or formed with a tool-holding channel 17 equipped with set-screws 18. The knee head 16 is made radially adjustable by a graduated screw 19, the construction and operation of which is well known.

In the ordinary use of this knee tool, a cutting tool for dressing the exterior of the lathe held object or piece of work for externally turning off the surface of the latter is, and has been in the past, tightly held by the set-screws 18 in the channel 17.

My auxiliary cutter holder involves a shank 20, preferably rectangular in cross-section, that is provided at one end with a head 21 having therein and extending therethrough a cutter receiving socket 22 which is also rectangular in cross-section and is of the proper dimensions to receive a final cutting tool 23 which, in the old use of the knee, would be applied in the channel of the knee head. The numeral 24 indicates a set-screw applied in the knee for locking the head 16 thereto against adjustments under the action of the screw 19.

In Fig. 1 the numeral 25 indicates a shaft or tube that is being bored out by the use of a long boring tool 26 applied in the head 21 of the auxiliary tool holder. Fig. 2 shows the shorter tool 23 used for counterboring placed in the socket 22 and clamped to the head 21 by countersunk clamping screws 27. In Fig. 2 the numeral 28 indicates a cylindrical shaft or block that is supposed to be held in the chuck of a lathe and the end of which is being counterbored by the use of the cutting tool 23 applied as shown in Fig. 2.

I have illustrated a preferred form of the invention but it will be understood that various alterations or changes in the auxiliary tool may be made within the scope of the claim hereunto appended.

What I claim is:

In a structure of the kind described, a knee having an axially projecting shank and a radially offset and radially adjustable head, the latter being formed with a clamping channel for primarily holding the cutting tool, a secondary cutting tool holder formed with a shank and a head, said shank fitting and detachably secured in the clamping channel of the head of said knee, said head having a socket to receive and hold a final cutting tool, the axis of said socket being disposed at an abrupt angle to said shank to adapt it to support the final cutting tool projecting therefrom at the above indicated abrupt angle to said shank and in a position to bore or counterbore a lathe operated piece of work.

JOHN A. LARSON.